(12) United States Patent
Frost et al.

(10) Patent No.: US 9,726,307 B1
(45) Date of Patent: Aug. 8, 2017

(54) ORIFICE HOLDER CONSTRUCTION

(71) Applicants: Tim Frost, Chattanooga, TN (US); Tony Byron Leeseberg, Chattanooga, TN (US)

(72) Inventors: Tim Frost, Chattanooga, TN (US); Tony Byron Leeseberg, Chattanooga, TN (US)

(73) Assignee: Burner Systems International, Inc., Chattanooga, TN (US)

( * ) Notice: Subject to any disclaimer, the term of this patent is extended or adjusted under 35 U.S.C. 154(b) by 0 days.

(21) Appl. No.: 14/615,610

(22) Filed: Feb. 6, 2015

Related U.S. Application Data

(63) Continuation of application No. 11/848,736, filed on Aug. 31, 2007, now abandoned.

(60) Provisional application No. 60/957,258, filed on Aug. 22, 2007.

(51) Int. Cl.
*F23D 14/46* (2006.01)
*F16L 13/14* (2006.01)
*F23D 14/64* (2006.01)

(52) U.S. Cl.
CPC ............ *F16L 13/147* (2013.01); *F23D 14/46* (2013.01); *F23D 14/64* (2013.01); *F23D 2213/00* (2013.01)

(58) Field of Classification Search
CPC ........ F16L 13/147; F23D 14/46; F23D 14/64; F23D 2213/00
See application file for complete search history.

(56) References Cited

U.S. PATENT DOCUMENTS

| | | | | |
|---|---|---|---|---|
| 3,063,494 A | * | 11/1962 | Meyer | F23D 14/08 239/416.3 |
| 5,727,303 A | * | 3/1998 | Ridenour | F16L 13/141 29/523 |
| 2008/0090192 A1 | * | 4/2008 | Dane | F23D 14/06 431/354 |

FOREIGN PATENT DOCUMENTS

FR   WO 2006040414 A1 *   4/2006   ............. F23D 14/06

* cited by examiner

*Primary Examiner* — Jonathan Masinick
*Assistant Examiner* — James A Linford
(74) *Attorney, Agent, or Firm* — Stephen J. Stark; Miller & Martin PLLC

(57) ABSTRACT

An orifice holder assembly provides a boss connected by at least one arm to a base having an outlet therethrough. The boss is provided below the outlet. A tube is inserted through the boss until a bead contacts a first boss surface and the tube end is then deflected to form a lip where the lip and the bead connects the tube to the boss. An orifice body is then inserted in the tube end.

16 Claims, 2 Drawing Sheets

ORIFICE HOLDER CONSTRUCTION

CLAIM OF PRIORITY

This application is a continuation of U.S. patent application Ser. No. 11/848,736 filed Aug. 31, 2007 which claims the benefit of U.S. Provisional Patent Application No. 60/957,258 filed Aug. 22, 2007 all of which are incorporated herein in their entirety.

FIELD OF THE INVENTION

The present invention relates to a tubing assembly and more particularly, to tube orifice and orifice holding assembly improvements.

BACKGROUND OF THE INVENTION

Member and tube assemblies such as the improvements shown in U.S. Pat. Nos. 5,607,194 and 5,727,303 have been performed by the applicant. While these improvements are useful, in order to connect the tube and orifice to an orifice holder, a separate connection system has been utilized to perform that connection. In the prior art, this connection was been done typically by screwing the threads such as the threads 41 of FIG. 4 of U.S. Pat. No. 5,607,194 into cooperating threads of an orifice holder. While this would provide easy installation replacement, it also could allow for such conditions to exist as imprecise placement of a tube relative to the orifice holders, (i.e., such as if the fitting was not inserted the proper amount). Furthermore, since the tubes which are connected to the fittings are not usually straight when they are installed in an oven, it may be extremely difficult to rotate a tube relative to an installed orifice holder. Furthermore, since there are not normally any moving parts at this location once installed, the opportunity for failure of these component parts is particularly small so replacement of one part relative to the other is not believed to be commonly performed.

While the prior art technology is certainly useful and continues to be widely practiced by the applicant, an improved manufacturing method and completed apparatus is believed to be desirable at least for some applications.

SUMMARY OF THE INVENTION

It is an object of the present invention to provide a tube securely connected to an orifice holder independent of cooperating threads.

It is another object of the present invention to provide a tube connected to an orifice holder in an improved manner.

It is another object of the present invention to provide a tube secured to an orifice holder such that the tube is connected to the orifice holder by the use of at least one tool applied through an air/fuel outlet of the orifice holder during the manufacturing process.

Accordingly, an orifice holder, tube and orifice assembly of the presently preferred embodiment preferably includes a tube which includes a bead or other stop on an exterior surface of the tube which contacts a first position of an orifice holder. A portion of the tube passes through a bore extending from the first position to a second position in the orifice holder. A tool such an a mandrel is preferably inserted through an outlet of the orifice holder and is used to flare out the tube at a second position of the orifice holder so that the tube is then secured to the orifice holder so that the orifice holder outlet as well as the tube outlet are disposed beyond the second position of the orifice holder. The tube is then provided with an orifice such as by screwing the orifice into the tube. The preferred method is believed to provide a cost savings to the manufacturer through construction while providing a high quality product for the completed product.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
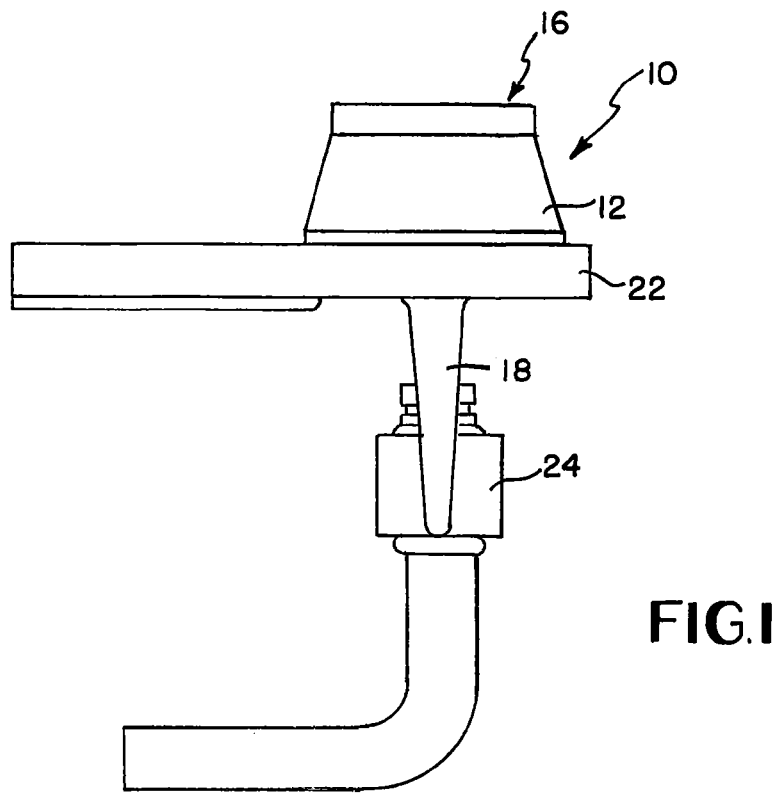
FIG. 1 shows a side view of an assembled orifice holder connected to a tube and an orifice of the presently preferred embodiment of the present invention from a side view.

FIG. 1 shows an orifice holder assembly 10 having an orifice holder 12 which is typically a cast part, and in the preferred embodiment, has been cast out of aluminum. Of course, other manufacturing techniques could be utilized to make other orifice holders. Casting has been found to be economical while providing a quality product.

Figure 2:
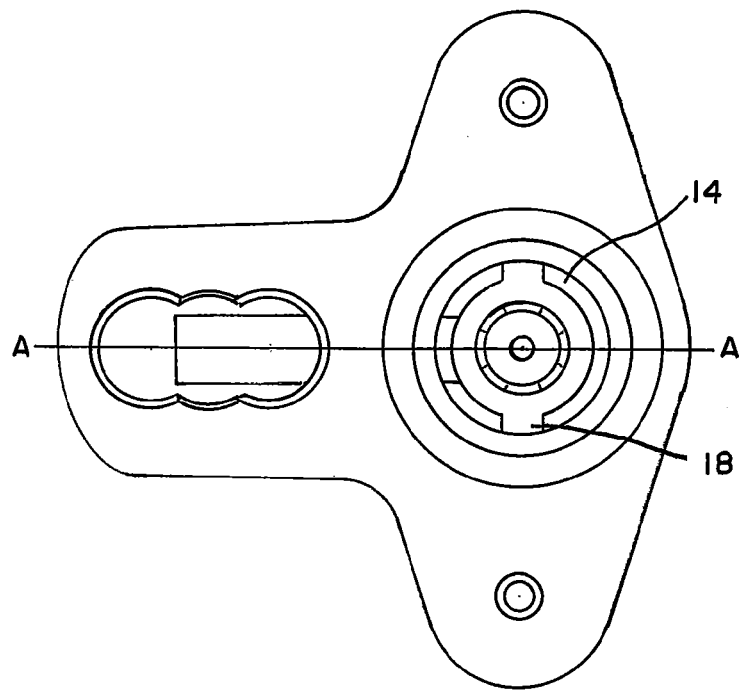
FIG. 2 shows a top view of the orifice holder assembly shown in FIG. 1.

The orifice holder 12 has an outlet 14, shown in FIG. 2, at a top end 16. The outlet 14 of this embodiment is illustrated as being at least substantially round and directs a fuel gas mixture from below through the outlet 14 past the top end 16 for use by a burner which is not shown. Many burner designs have been constructed. Other orifice holders have been utilized in the past for such uses.

Figure 3:
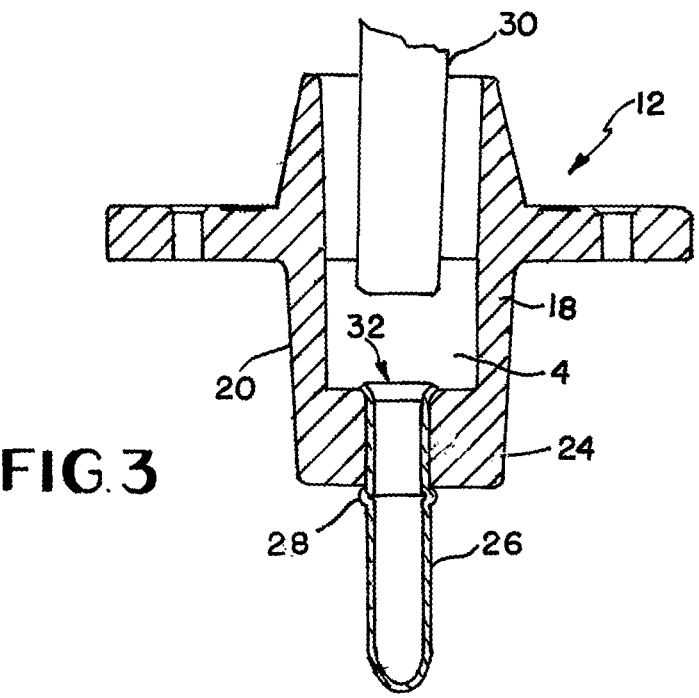
FIG. 3 shows a process of manufacturing the orifice holder assembly as shown in FIGS. 1 and 2.
Figure 4:
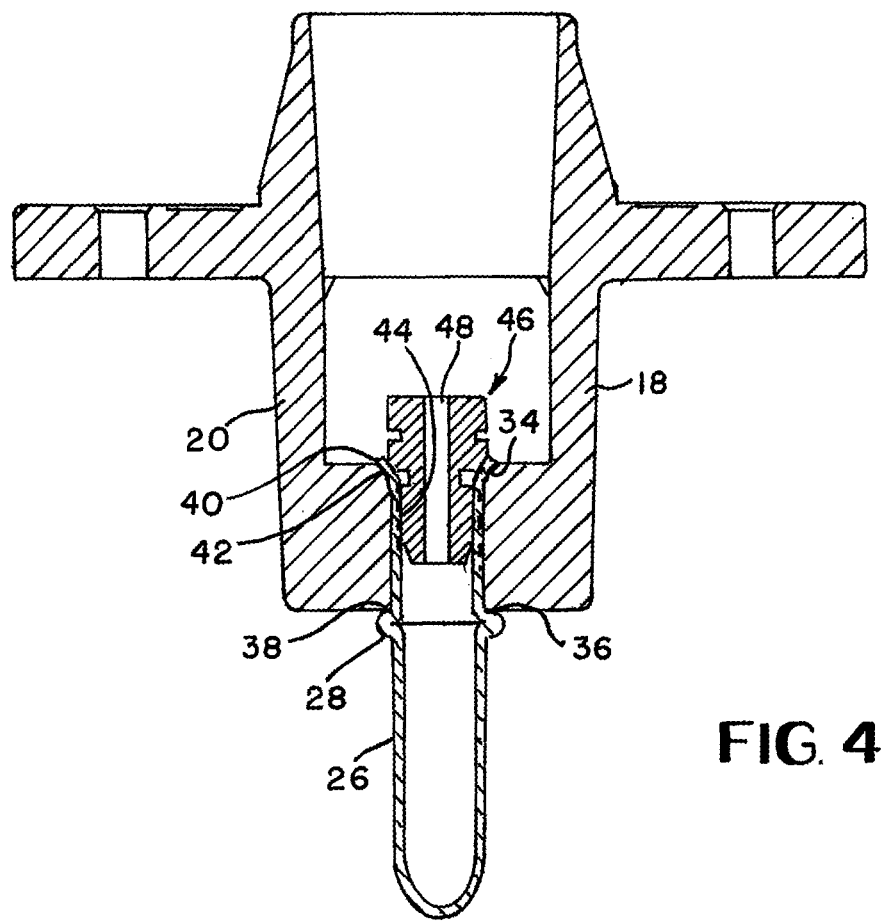
FIG. 4 shows a detailed cross sectional view of a detail marked as A in FIG. 3 after the manufacturing step has been completed and the orifice installed as would be in FIGS. 1-2.

This orifice holder has two arms 18,20 which are shown in FIG. 3, extending from a base 22. These arms connect at a boss 24 which is configured to have a bore therethrough which receives a portion of tube 26 therethrough. A bead 28 is preferably utilized to stop the tube 26 a desired position relative to the boss 24 as shown in FIGS. 3 and 4 during the assembly process. Other mechanisms known in the art can also be utilized which provide a stop so that no further travel of the tube 26 through the bore can occur due to the presence of the bead 28.

Once the tube 26 is installed as shown in FIG. 3, an anvil 30 or other device is inserted through the outlet 14 of the orifice holder 12 and causes the end 32 of the tube 26 to be deflected such as shown in FIG. 4 so that the boss 24 of the orifice holder is secured relative to the lip 34 created by the bent tube 26 and the bead 28. This method of construction is believed to be a large improvement over the prior art in that in the prior art such as shown in U.S. Pat. Nos. 5,607,194 and 5,727,303.

In the prior art, a separate nut and thread arrangement was utilized to secure those fittings to orifice holders. By manufacturing an orifice holder as shown and described in the figures herein, at least several manufacturing steps and parts can be omitted which is believed to result in a cost savings to at least the manufacturer, if not the end user.

As shown in FIG. 3, the bead 28 has a boss engagement flange 36 which is shown adjacent to a first boss surface 38 and lip 34 as has a lip engagement surface 40 which engages second boss surface 42. Additionally, arms 18,20 are illustrated extending above the lip 34 as well as above the orifice body 46.

After connecting the tube 26 to the orifice holder 12, if the tube end 32 is not already provided with threads is may be tapped so that it has threads 44 as shown in FIG. 4 by directing the tap (not shown) through the outlet 14 and providing the threads 44 as shown in FIG. 4 in a similar manner as anvil 30 is shown applied in FIG. 3. Alternatively, and more preferably, the orifice body 46 may make its own threaded connection (i.e., somewhat self tapping). The orifice body 46 with its cooperating threads is then inserted preferably through the outlet 14 so that its cooperating threads engage threads 44 so it can be provided in the position shown in FIG. 4. The orifice body 46 then has bore 48 which allows for the gas from the tube 26 to then mix with air in the space 49 prior to being directed through the outlet 14 where mixing can further continue to occur within a burner (not shown) before being lit and providing heat in a stove type configuration.

While it is alternatively possible to provide an anvil 30, tap or orifice at the space 48 below to the base 22 to flare the lip 34 and/or install the orifice body 46 in a similar manner, the presently preferred embodiment as described herein provides the connection of the tube 26 to the boss 24 through application through the outlet 14 as well as the machining of the tube 26 to provide threads 44 if not done prior to the installation of the tube 26 to the boss 24. Finally it is also presently preferred to install the orifice body 46 through the outlet 14.

It is important to remember that in the prior art the machining of the tube 26 to a fitting has been performed before installing the fitting to an orifice holder 12. Opposing, or oppositely directed, shoulders 50 extend from the base 22. The shoulders 50 have vertically oriented bores 52,54 extending therethrough for a connection to a stove as would be understood by those ordinarily skilled in the art. Thus, the orifice holder as would be understood by those ordinarily skilled in the art would be one that would start the mixing process of air and gas below the connection of the shoulders to the top of the stove.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

The invention claimed is:

1. An orifice holder assembly comprising:
a cast orifice holder of unitary construction having a base connected by at least one arm to a boss, said boss located below the base and having a bore therethrough extending from a first boss surface to a second boss surface with said second boss surface located above the first boss surface, said base having an outlet extending through the base concentrically disposed relative to the bore through the boss, with the boss integrally connected by the at least one arm to the base, the base having oppositely directed shoulders with vertically external bores therethrough for securing the orifice holder to a stove;
a tube received by the boss, said tube having a preformed bead disposed about the tube spaced from a tube end, said bead contacting the first boss surface with a portion of the tube extending through the bore of the boss, said tube then deformed at the tube end to provide a lip with a lip engagement surface in contact with the second boss surface external to the bore with the lip and the bead forming a mechanical connection of the tube to the boss by entrapping a portion of the boss between the lip and bead; and
an orifice body connected to the tube end and having a bore therethrough, said orifice body located below the base with a space above the orifice body and below the base and said orifice body terminating internal to the boss above the first boss surface;
wherein the at least one arm consists of two separate and distinct arms extending from the base to the boss, wherein the base and the boss are longitudinally separate and concentric with each other and the two arms extend from an internal diameter of the base to an external diameter of the boss, and wherein the two arms are oppositely and symmetrically disposed relative to the orifice body.

2. The orifice holder assembly of claim 1 wherein the orifice body has external threads which are in contact with an internal portion of the tube toward the tube end.

3. The orifice holder assembly of claim 1 wherein at least one arm is integrally connected to and extend from the boss.

4. The orifice holder assembly of claim 3 wherein the at least one arm is integrally connected to the base and the first boss surface against the bead is the lowest portion of the boss.

5. The orifice holder of claim 1 wherein the orifice holder is cast aluminum.

6. The orifice holder assembly of claim 1 manufactured by the process of providing a tube end having a smaller cross section than the bore of the boss until physically deflected to provide the lip, inserting the tube end through the bore of the boss until the bead contacts the first boss surface, and then deflecting the tube end to provide the lip external to the bore of the boss.

7. The orifice holder assembly of claim 6 wherein the process of manufacturing the orifice holder assembly further comprises after deflecting the tube end to provide the lip, then inserting the orifice body at the tube end.

8. The orifice holder assembly of claim 7 wherein the orifice body has self-tapping external threads which connect the orifice body to the tube end.

9. An orifice holder assembly comprising:
a cast orifice holder having an outlet in a base spaced above shoulders with vertically external bores for connecting to a stove top, and the orifice holder further having the base connected by at least one arm to a boss of a unitary construction, said boss located under the outlet and having a bore therethrough extending from a first boss surface to a second boss surface with said second boss surface located above the first boss surface and the outlet concentrically disposed relative to the bore, with the base integrally connected by the at least one arm to the boss;
a tube received by the boss, said tube having a preformed bead disposed about the tube spaded from a tube end, said bead contacting the first boss surface with a portion of the tube extending through the bore of the boss, said tube deformed after insertion to provide a lip at the tube end with a lip engagement surface in contact with the second boss surface external to the bore with the lip and the bead forming a mechanical connection of the tube to the boss by entrapping a portion of the boss between the lip and bead; and an orifice body connected to the tube end and having a bore therethrough, said orifice body located below the outlet with a space above the orifice body and below the outlet, and said orifice body terminating internal to the boss above the first boss surface;

wherein the at least one arm consists of two separate and distinct arms extending from the base to the boss, wherein the base and the boss are longitudinally separate and concentric with each other and the two arms extend from an internal diameter of the base to an external diameter of the boss, and wherein the two arms are oppositely and symmetrically disposed relative to the orifice body.

10. The orifice holder assembly of claim 9 manufactured by the process of providing a tube end having a smaller cross section than the bore of the boss until physically deflected to provide the lip, inserting the tube end through the bore of the boss until the bead contacts the first boss surface, and then deflecting the tube end to provide the lip external to the bore of the boss.

11. The orifice holder assembly of claim 9 wherein the tube end is physically deflected with a device extending through the outlet of the orifice holder which is removed after forming the lip.

12. The orifice holder assembly of claim 11 wherein the process of manufacturing the orifice holder assembly further comprises after deflecting the tube end to provide the lip, then inserting the orifice body at the tube end.

13. The orifice holder assembly of claim 12 wherein the orifice body has self-tapping external threads which connect the orifice body to the tube end.

14. The orifice holder assembly of claim 9 wherein the orifice body has external threads which are in contact with an internal portion of the tube toward the tube end and the bead is located external to the bore.

15. The orifice holder assembly of claim 9 wherein the at least one arm is integrally connected to the base and the boss and the bead is located below the first boss surface.

16. The orifice holder assembly of claim 9 wherein the orifice holder is cast aluminum.

* * * * *